United States Patent [19]
Amort

[11] 3,711,002
[45] Jan. 16, 1973

[54] VARIABLE PRECISION FILM DRIVE
[75] Inventor: Andrew L. Amort, Ann Arbor, Mich.
[73] Assignee: Xerox Corporation, Stamford, Conn.
[22] Filed: Oct. 18, 1971
[21] Appl. No.: 189,989

[52] U.S. Cl. ...................226/32, 226/34, 226/156, 226/141
[51] Int. Cl. .............................................B65h 17/22
[58] Field of Search..........226/33, 43, 156, 141, 188, 226/34, 32

[56] References Cited
UNITED STATES PATENTS 3,338,488  8/1967  Hunt.................................226/141 X
3,369,449  2/1968  Klauss et al........................226/141 X
3,460,732  8/1969  Kallenberg.........................226/141 X

*Primary Examiner*—Allen N. Knowles
*Attorney*—Olsen and Stephenson

[57] ABSTRACT

Apparatus for advancing imperforate film in a camera in increments so that the exposures on the film will be accurately located for subsequent use in the production of microfiche. Operation of a film drive mechanism is electrically controlled to provide a series of exposures that are accurately spaced on the film. An electronic programmer facilitates generation of various filming formats.

18 Claims, 4 Drawing Figures

VARIABLE PRECISION FILM DRIVE

BACKGROUND OF THE INVENTION

The present invention relates to apparatus for accurately advancing a workpiece in increments, and especially to a variable precision film drive for use with imperforate film to provide exposures that are accurately located on the film.

Microfiche readers normally are adapted to be used with microfiches that contain a large number of individual frames, and an individual frame is quickly found by the user of the reader by moving a position indicator to the correct coordinates on a guide card. The image from a selected frame is then projected onto a relatively large screen for reading purposes. When so used it is highly desirable that the individual frames on the microfiches be accurately located so that their positions correspond to that of the position indicator.

In the normal procedure for making a microfiche, a roll of imperforate film is fed through a camera and a series of exposures are taken of the subject matter that is to comprise the images in the frames. After the desired exposures have been taken to form a line of the microfiche, a space corresponding, for example, to the width of three frames is left on the film, after which the cycle is repeated and a second line containing the desired number of exposures is formed. This procedure is repeated so that a plurality or horizontal lines for each microfiche is provided.

One of the problems that has existed in the past in the production of microfiches is that the film drive apparatus used heretofore for advancing the imperforate film through the camera has failed to provide with regularity uniform and accurate spacing between individual frames. Often the errors that occur may be cumulative so that the frames in the several lines on a microfiche are not in vertical alignment. Also, the prior art devices have failed to provide means for simply and accurately varying the widths of the frames so that the film drive apparatus will have greater application and can be used readily to produce microfiche wherein the frames of one microfiche may have a selected width different from that of another microfiche.

SUMMARY OF THE INVENTION

The present invention has overcome the inadequacies of the prior art and has provided a variable precision film drive apparatus wherein the widths of the individual frames can be accurately established, and wherein the spacing between individual frames is also accurately established.

According to a preferred form of the present invention, a variable precision film drive apparatus is provided for use with a camera, the apparatus comprising an output rotor for advancing the film, a reversible motor means, transmission means coupling the motor means to the output rotor for driving the output rotor only during rotation of the motor means in one direction and control means for controlling operation of the reversible motor means and transmission means. The control means includes a metering member movable between first and second positions in accordance with the direction of rotation of the reversible motor means, stop means against which said metering member is seated at said first position, a first switch means for starting said reversible motor means in the one direction of rotation so that the metering member moves away from the stop member, a second switch means at the second position of the metering member adapted to be engaged by the metering member for reversing the direction of rotation of the reversible motor means, said transmission means responsive to the control means to lock the output rotor for rotation with the reversible motor means when the latter is moving in its one direction, and to lock said output rotor against rotation when the reversible motor is moving in the other direction. The transmission means and control means are constructed and arranged so that slippage and backlash is eliminated to assure precise and accurate location of each exposure on the film.

In the preferred embodiment of the invention, the adapted of advancement of the film is controlled by the spacing between the stop means in connection with the second switch means between which the metering member is adapted to reciprocate. The position of the second switch means is adjustable relative to the stop means so that the amount of advancement of the film can readily be varied merely by relocating the position of the switch means with respect to the stop means.

The preferred embodiment of the invention is especially adapted for use as a drive apparatus for film, but it can be used also in connection with other types of workpieces which require precision advancement in increments.

Thus, it is among the object of the present invention to provide improved apparatus for advancing workpieces accurately in increments.

Other objects of this invention will appear in the following description and appended claims, reference being had to the accompanying drawings forming a part of this specification wherein like reference characters designate corresponding parts in the several views.

DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 2:
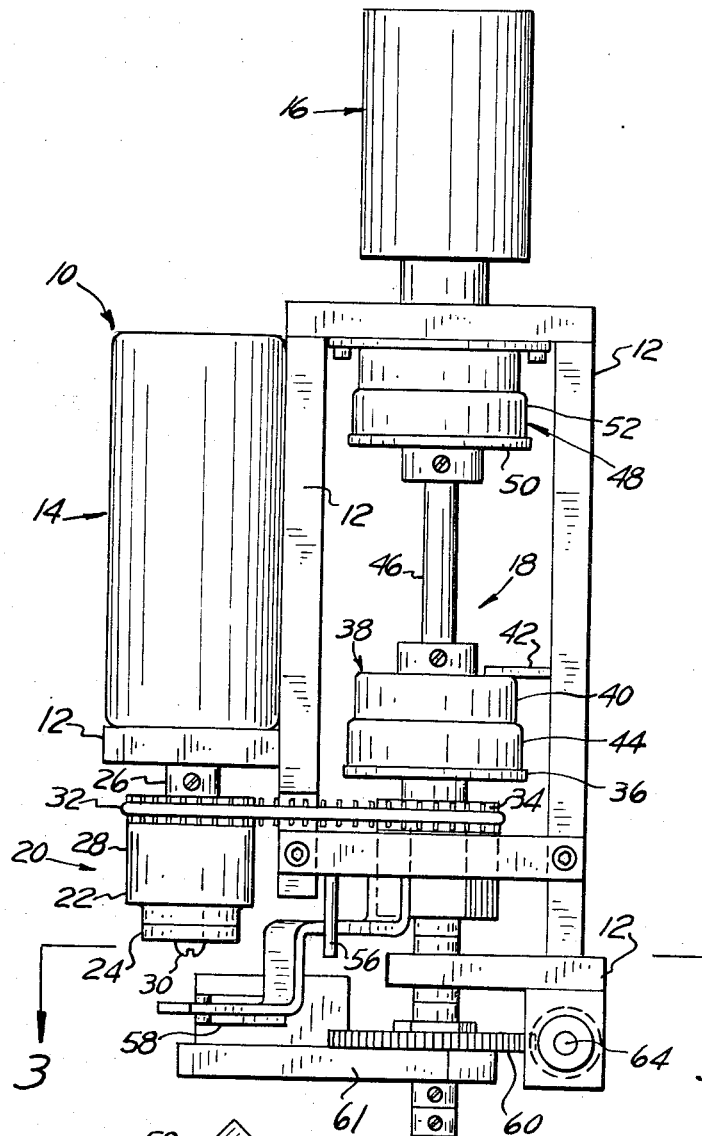
FIG. 2 is a side elevational view of the film drive apparatus.

Referring to the drawings, and initially to FIGS. 2 and 3, the invention will be described in greater detail. The variable film drive apparatus 10 includes a frame 12 on which is supported a reversible motor means or DC electric motor 14. An output rotor 16 is also mounted on the frame 12 for rotation and is adapted to drive film through a camera, not shown. A transmission means 18 is coupled between the motor means 14 and the output rotor 16 to provide positive drive to the output rotor 16 in only one direction of rotation of the motor means 14.

The transmission means 18 includes a first clutch means 20 that has a one-way clutch 22 and a teflon friction clutch 24. The hub 26 of the one-way clutch 22 is locked to the shaft of the motor means 14 and is connected in a conventional matter to the outer drum 28 for driving the latter only when The motor means 14 turns in said one direction. The teflon friction clutch 24 is connected to the inner hub 26 by the screw 30 and is in frictional engagement with the outer drum 28 for returning the outer drum when the motor means 14 turns in its other direction of rotation.

A timing belt 32 is connected for imparting a positive drive from the outer drum 28 to a rotary input member 34 that is integrally connected with the clutch face 36 of the second clutch means 38. The second clutch means 38 is an electro-mechanical clutch that has a coil 40 held in a stationary position with respect to the frame 12 by the bracket 42, and a rotor 44 that is keyed to the drive shaft 46 for the output rotor 16.

Mounted on the output shaft 46 between the second clutch means 38 and the output rotor 16 is a brake means 48 which in the illustrated embodiment is an electro-mechanical brake which has a face 50 secured to the shaft 46 for rotation therewith and a coil portion 52 which is secured to the frame 12 in a stationary position. The electro-mechanical clutch 38 and the electro-mechanical brake 48 are arranged in an electronic circuit, to be described in connection with FIG. 1 whereby when the second clutch means 38 is electrically energized, drive from the motor means 14 in one direction will be transmitted via the first clutch means 20, timing belt 32, input member 34, drive shaft 46, to output rotor 16. During this phase of the operation the brake means 48 will be deenergized so as to be in a released or deactivated state. When the motor means 14 is energized to rotate in the other direction the brake means 48 will be energized and the second clutch means 38 will be deenergized so that the output drive shaft 46 will be locked against rotation. During this phase of the operation the teflon friction clutch 24 will function to provide a drive in the other direction of the timing belt 32 for rotation of the input member 34 in the other direction.

Figure 3:
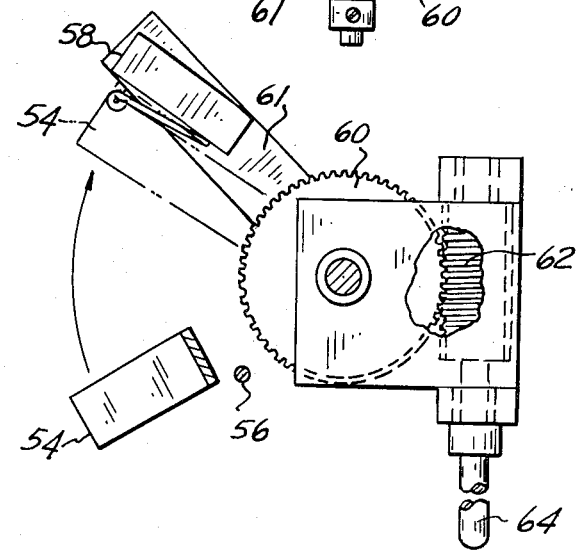
FIG. 3 is a section taken on line 3-3 of FIG. 2.

Integrally secured to the rotary input member 34 is a metering arm 54 adapted to be moved between its first position shown in solid lines in FIG. 3 to its second position shown in phantom in FIG. 3. When in its first position the metering arm 54 will be in abutment with the stop means 56 which is integrally connected to the frame 12, and when in its second position the metering arm 54 will be in engagement with a micro-switch or second switch means 58 that is integrally connected to the worm wheel 60 by the arm 61. The normal position of the metering arm 54 before advancement of the film by the motor means 14 will be the one position shown in solid lines in FIG. 3 and the length of the stroke of the metering arm until it engages the micro-switch or second switch means 58 will determine the extent of advancement of the film by the output member 16. The second switch means 58 is in the control circuit to be described, whereby when the switch means 58 is actuated the second clutch means 38 will be deenergized and the brake means 48 will be energized so that the rotary movement of the output rotor 16 will be substantially instantaneously interrupted, and at the same time the direction of rotation of the motor means 14 will be reversed. Reversal of the motor means 14 will result in the metering arm 54 returning to its first position where it will be in readiness to repeat the cycle after the switch associated with the camera is actuated to again energize the motor means 14 for turning its one direction for advancement of film on the output rotor 16. Timer means to be described are located in the electric control circuit to deenergize the motor means 14 after the metering arm 54 has returned to its first position against the stop means 56.

The magnitude of the advancement of the film during each cycle of operation is controlled by the length of the stroke of the metering arm 54. In the illustrated embodiment the length of the stroke can be varied readily by turning the worm 62 which is in mesh with the worm wheel 60, thereby selectively varying the angular displacement of the switch means 58 with respect to the stop means 56 or first position of the metering arm 54. The worm 62 can be manually rotated by means of the shaft 64.

Figure 1:
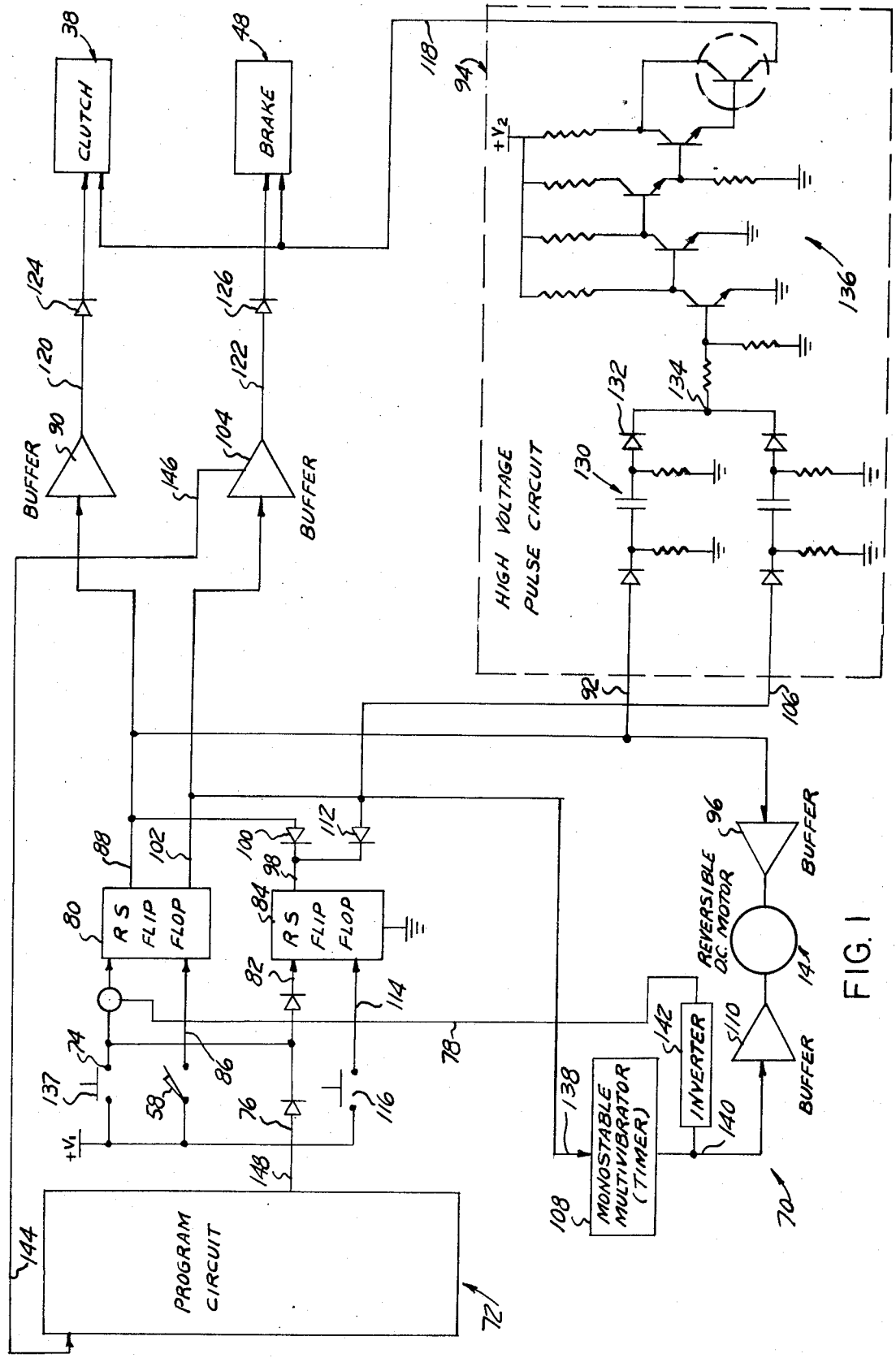
FIG. 1 is a block diagram of the control circuits for a variable precision film drive apparatus embodying the present invention with a portion of the electronic control circuits being shown schematically.
Figure 4:
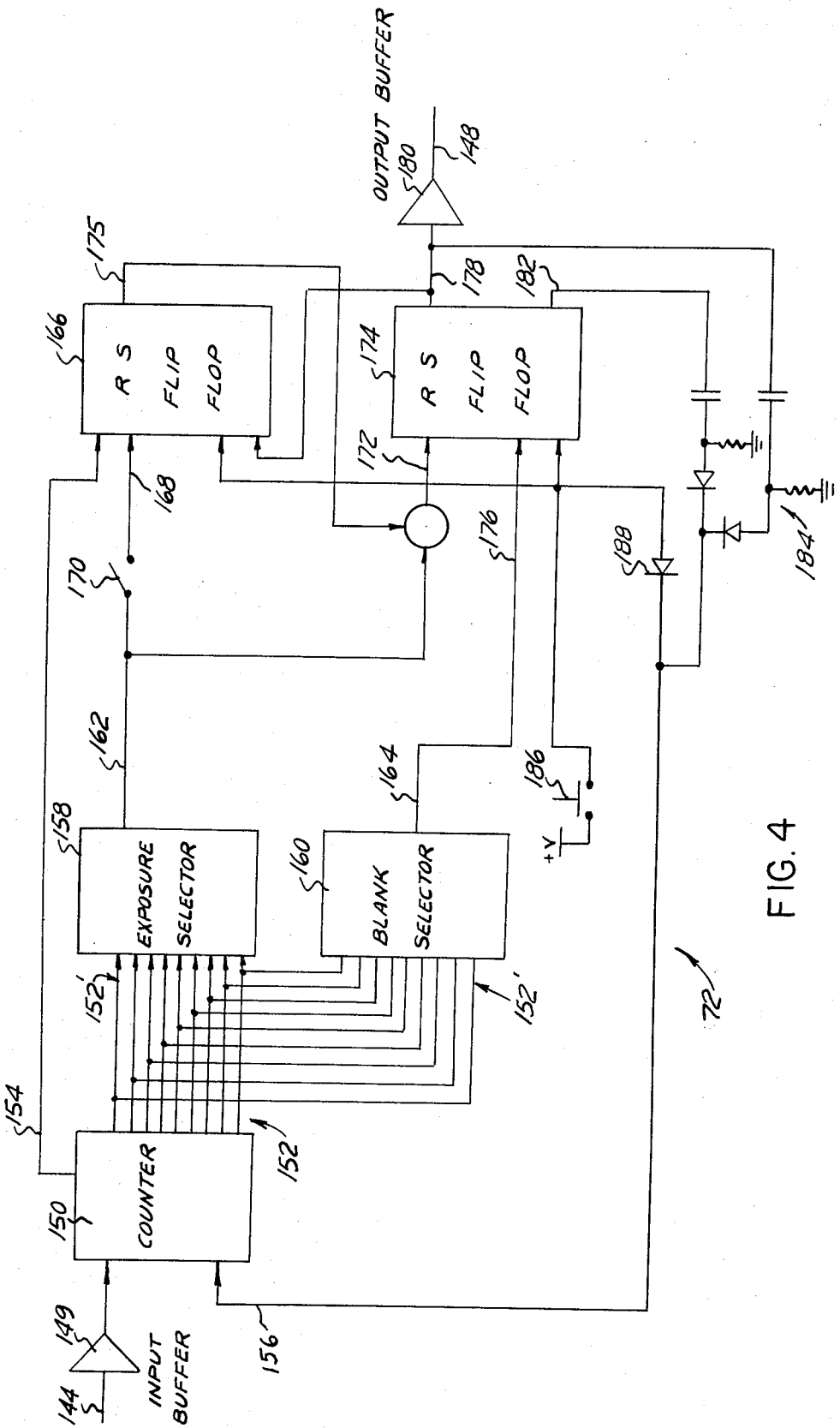
FIG. 4 is a block diagram of the program circuit of the embodiment illustrated in FIG. 1.

Attention is directed next to FIGS. 1 and 4 for a description of the control circuit in the illustrated embodiment of the invention.

The control circuit embodies a sequencer circuit shown generally at 70 and a program circuit shown at 72. When the sequencer circuit 70 is properly triggered, its logic elements cause the film drive 10 to cycle once and advance the film as described above. The program circuit 72 counts the number of cycles made by the sequence circuit 70 and initiates sequence circuit cycles in response to preselected filming formats.

The sequence circuit 70 has gated inputs 74 and 76 which when gated on by a timed feedback 78 can initiate an apparatus cycle. The gated inputs 74 and 76 are logically OR ed together to provide the set function for a standard R.S. flip flop 80. The inputs 74 and 76 are also connected to the set input 82 of a release flip flop 84 in an ungated logical OR mode. The reset input 86 of the flip flop 80 is attached to micro-switch or second switch means 58. The set output 88 of flip flop 80 is connected to the second clutch means 38 via buffer amplifier 90 to an input 92 of a high voltage pulse circuit 94 to the reversible motor 14 via a forward drive buffer amplifier 96 and to the set output 98 of flip flop 84 via diode 100. The reset output 102 of the flip flop 80 is connected to the brake 48 via buffer amplifier 104, to another input 106 of the high voltage pulse circuit 94, to the reversible motor means 14 via a monostable multivibrator or timer 108 and reverse drive buffer amplifier 110 and to the set output 98 of release flip flop 84 via diode 112. The reset input 114 of release flip flop 84 is connected to a release switch 116 the function of which will be described.

The high voltage pulse circuit 94 has an output 118 which is connected to both clutch 38 and brake 48 and in parallel with and gated by buffer output 120 and 122. Thus configured the output 118 can only activate the brake means 48, for example, if the output line 122 has a signal. Diodes 124 and 126 are provided in buffer outputs 120 and 122 to protect the buffer amplifier from the high voltage pulse imposed on line 118 by the high voltage pulse circuit 94. The high voltage pulse circuit 94 is activated when a positive going signal is present at either input 92 or 106. Taking input 92 as an exemplary, the signal is differentiated by differentiator circuit 130 and rectified by diode 132 to form a pulse at node 134 of 15 milliseconds duration, for example. The circuitry 136 to the left of node 134 amplifiers and shapes the pulse to deliver a high voltage pulse at output 118 approaching an amplitude of $N_2$ or 45 volts, for example. If "0" indicates the absence of a signal on a line and "1" indicates the presence of a signal, the sequencer circuit 70 operates as follows. When the film is to be loaded into the camera, the release switch 116 is pressed. Release flip flop 84 is reset causing output 98 to go to a "0" state, and thus output 98 pulls down both outputs 88 and 102 to a "0" state as well. Since outputs 88 and 102 are in the "0" state outputs 120 and 122 of the buffer amplifier 90 and 104 are also in the "0" state and the second clutch means 38 and brake means 48 are deenergized, thus allowing the allowing the rotor 16 to turn freely as the film is loaded. Once the film is loaded and the operator is ready, camera switch or first switch means 137 is depressed by the operator to cycle the apparatus 10, closing camera switch or second switch means 74 simultaneously sets both flip flops 80 and 84, thus causing line 88 to achieve a "1" state and line 102 to achieve a "0" state. Line 98 is also in a "1" state and because of diodes 110 and 112 its state has no effect on the state of either line 88 or 102. Since line 88 is in the "1" state, second clutch means 38 is activated via buffer amplifier 90. At the same time forward drive buffer amplifier 96 is turned on by the "1" state of line 88 and in turn energizes reversible motor means 14. The "1" state of line 88 also triggers input 92 of high voltage pulse circuit 94 which initially sends a high voltage pulse to the second clutch means 38 via output 118 to ensure rapid initial clutch energization before the motor means 14 has begun to turn.

The motor means 14 continues turning until the metering arm 54 closes micro-switch or second switch means 58 and resets flip flop 80. Line 102 achieves a "1" state which is transmitted to timer 108 via input 138. The output 140 of timer 108 immediately goes to a "1" state to turn on reverse buffer amplifier 110 and thus drive reversible motor 14 in its reverse direction. Output 140 is also connected to inverter 142 which logically inverts the input state of "1" and produces a "0" state on line 78 which disables inputs 74 and 76 until the timer 108 goes back to its ambient output state of "0." Thus if the operator keeps the camera switch or first switch means 137 depressed, that has no effect on the ability of flip flop 80 to reset and thereby control the sequence of the cycle. Since the flip flop 80 is thus reset and the outputs 88 and 102 are in the "0" and "1" respectively, the brake means 48 is energized (utilizing the high voltage pulse circuit 94 in the same manner to rapidly energize the brake means 48 as was described above with respect to energizing the second clutch means 38) and the second clutch means 38 is deenergized. As the motor means 14 rotates in reverse, the output rotor 16 is held stationary by the brake means 48, and the motor means 14 is disengaged from shaft 46 due to the second clutch means 38 being deenergized.

The motor means 14 continues in reverse until the timer 108 returns to its ambient output state of "0." The timer 108 is adjusted to allow sufficient time for the metering arm 54 to be returned to its stop means 56. When the timer 108 does return to its ambient "0" output state, the inverter output 78 returns to a "1" state, thus ready to gate in the next initiate signal. If either output 74 or 76 is in the "1" state at that time, the next cycle will start immediately. If neither input 74 or 76 are in the "1" state, the apparatus 10 will stop until first switch means 137 is next closed or a "1" state is presented by the program circuit 72 as to be next explained.

The program circuit 72 (FIG. 4) has an input 144 which connects to a feedback 146 from buffer amplifier 104 of sequencer circuit 70 (FIG. 1) and an output 148 which connects to input 76 of the sequencer circuit 70.

The feedback input 144 is connected via a buffer 149 to a counter 150 which counts the number of times line 102 goes to a "1" state when the brake means 48 is being energized. The counter 150 provides a "1" state on one of nine output lines 152 corresponding to the count. After the count reaches nine, the counter automatically resets and gives a "1" pulse output on line 154 corresponding to a carry. The counter has a reset input 156 which causes the counter to reset to zero when a "1" state is imposed. The outputs 152 are connected in parallel to an exposure selector 158 and a blank selector 160. Each selector has an output 162 and 164 respectively which goes to a "1" state when one of the input lines 152' is in the "1" state and corresponds to the preselected number set on the selector by the operator to establish a filming format. The exposure selector output 162 is connected to a first pass flip flop 166 via set input 168 and decade switch 170. The exposure selector output 162 is also gated into a set input 172 of output flip flop 174. A set output 175 of the first pass flip flop 166 is used to gate the input 172. The blank selector output 164 is connected to a reset input 176 of output flip flop 174.

Output flip flop 174 has a set output 178 which connects to program circuit output 148 via buffer 180 and which is also used to reset first pass flip flop 166. Output flip flop 174 also has a reset output 182 which when combined with output 178 in differentiator rectifier circuit 184 provides a "1" state pulse to reset counter 150 whenever output flip flop 174 changes states. Switch 186 is connected to both flip flops 166 and 174 and counter 150 via diode 188 to provide a manual reset for the program circuit 72.

In operation, initially both flip flops 166 and 174 are cleared, the counter 150 is reset to zero, and the output 148 is in the "0" state. Assume, for example, that exposure selector 158 is set for three plus ten (indicated by the decade switch 170 being opened) or thirteen and the blank selector 160 is set at two. During the first apparatus cycle initiated by camera switch or first switch means 137, the feedback 146 (FIG. 1) will cause the counter to count to one. Since a count of one gives no selector outputs, the output 148 will remain at a "0" state, and the next cycle will only begin when camera switch 137 is again closed.

At the count of two a "1" output will be present at blank selector output 164 which will have no effect since output flip flop 174 is already in the reset condition.

At the count of three, exposure selector output 162 will be in the "1" state, but because the first pass flip flop 166 is reset with a "0" state on output 175, the "1" state of output 162 won't be gated into input 172 to set the output flip flop. No change in the program circuit output 148 will thus occur.

At the count of 10 the counter will automatically reset itself and produce a carry signal on line 154 which will set the first pass flip flop 166.

At the count of 12 a "1" state at output 164 will have no effect on output flip flop 174 which is still in the reset state.

At the count of 13 the "1" state of exposure selector output 162 is now gated into input 172 by the "1" state of output 175 of first pass flip flop 166. The output flip flop 174 toggles and a "1" output is generated on line 148. Simultaneously, output 178 resets the first pass flip flop 166, and the counter 150 is reset by circuit 184 which detected the change of state in line 178.

The "1" state of output 148 acts to cause the sequencer circuit 70 to recycle automatically when the timer 108 returns to its ambient output state. As the sequencer circuit 70 continues cycling the counter 150 begins counting until the blank selector count is reached at which time the blank selector output 164 resets the output flip flop 174 thereby returning the program circuit output 148 to a "0" state and resetting the counter 150. At this point the sequencer circuit 70 stops cycling to await the next closing of the camera switch or first switch means 137 to begin the exposure count again.

It is claimed:

1. A variable precision film drive apparatus for use with a camera comprising an output rotor for advancing the film, a reversible motor means, transmission means coupling said motor means to said output rotor for driving said output rotor only during rotation of said motor means in one direction, and control means for controlling operation of said reversible motor means and said transmission means, said control means including a metering member movable between first and second positions in accordance with the direction of rotation of said reversible motor means, stop means at said first position, a first switch means for starting said reversible motor means in said one direction so that said metering member moves away from said stop means, a second switch means at said second position to be engaged by said metering member for reversing the direction of rotation of said reversible motor means, said transmission means being responsive to said control means to lock said output rotor for rotation with said reversible motor means when the latter is moving in said one direction and to lock said output rotor against rotation when said reversible motor means is moving in the other direction.

2. The variable precision film drive apparatus that is defined in claim 1, wherein one of said second switch means and said stop means is movable relative to the other to vary the length of the stroke of said metering member and thereby the length of film that is advanced per cycle of the film drive apparatus.

3. The variable precision film drive that is defined in claim 1, wherein said control means includes a sequencer circuit for sequentially controlling said reversible motor means and said transmission means, and a program circuit having a logic input and a logic output logically interconnecting said sequencer circuit, said sequencer circuit having first and second logically OR ed inputs connected respectively to said first switch means and said logic output of said program circuit for receiving signals therefrom for selectively triggering said sequencer circuit, a sync input connected to said second switch means providing synchronization to said sequencer circuit, a feedback logic output connected to said logic input of said program circuit to condition said program circuit in response to advancement of the film, analog drive outputs connected to said transmission means, and bipolar analog outputs connected to said reversible motor means for controlling operation of said output rotor for advancing the film in increments.

4. The variable precision film drive that is defined in claim 3, wherein said analog outputs connected to said transmission means comprises parallel connected first and second drive lines, said first drive line being driven by a relatively low voltage drive source, and said second drive line being initially pulsed by a relatively high voltage drive source so that said transmission means can be rapidly energized and deenergized.

5. The variable precision film drive that is defined in claim 3, wherein said sequencer circuit has a release input which when triggered deenergizes said analog outputs connected to said transmission means thereby allowing said film to be freely moved past said output rotor.

6. The variable precision film drive that is defined in claim 3, wherein said sequencer circuit has a monostable multivibrator which, when triggered by said second switch means connected to said sync input, operates to drive one of said bipolar analog outputs and thus drive said reversible motor means in its reverse direction for a predetermined time duration sufficient to return said metering member to said stop means.

7. The variable precision film drive that is defined in claim 3, wherein said program circuit has its logic input connected to said feedback output of said sequencer circuit, said logic input operates to count the number of cycles said sequencer circuit initiated by said first switch means corresponding to a predetermined number of film exposures and then upon reaching a predetermined count said program circuit initiates via its logic output a preselected number of cycles of said sequencer circuit corresponding to a preselected number of film blanks.

8. Apparatus for accurate incremental advancement of a workpiece comprising an output rotor for advancing the workpiece; a reversible motor means; transmission means coupling said motor means to said output rotor including first clutch means providing positive drive in one direction of said motor means, second clutch means which has a rotary input member and is arranged for turning said output rotor in response to turning of said first clutch means in said one direction, and brake means for locking said output rotor against turning when said reversible motor means is turning in said other direction; and control means including a metering arm connected to the rotary input member of said second clutch means for movement therewith, stop means for limiting the movement of said metering arm in said other direction, first switch means, second switch means positioned to be actuated by engagement thereof by said metering arm when said metering arm is moved in said one direction, and a control circuit including said first and second switch means, said reversible motor means, said second clutch means and said brake means, said control circuit being operable when said first switch means is closed to energize said motor means for turning in said one direction and simultaneously to engage said second clutch means and to release said brake means so that said output rotor is turned by said motor means until said metering arm actuates said second switch means, and operable when said second switch means is closed by engagement therewith of said metering arm to reverse the direction of rotation of said motor means and simultaneously to release said second clutch means and to lock said brake means so that said output rotor will be held stationary while said metering arm is returned to said stop means and until said second clutch means is reenergized in the next succeeding cycle of operation.

9. The apparatus that is defined in claim 8, wherein said first clutch means comprises a one-way clutch that provides positive drive in said one direction of turning of said motor means, and a friction clutch that provides a drive in said other direction of turning of said motor means.

10. The apparatus that is defined in claim 8, wherein one of said stop means and said second switch means is movable relative to the other for selectively establishing the length of stroke of said metering arm and thereby setting the magnitude of the incremental advancement of said workpiece.

11. The apparatus that is defined in claim 10, wherein said second switch means is mounted on a worm wheel for angular movement about the axis of said second clutch means, and a worm is in mesh with said worm wheel for selectively setting the position of said second switch means.

12. The apparatus that is defined in claim 8, wherein said second clutch means is an electro-magnetic clutch wherein said rotary input member is the clutch face, and wherein the rotor of the clutch is mounted for rotation with said output rotor.

13. The apparatus that is defined in claim 8, wherein said brake means is an electro-magnetic brake wherein one of the relatively rotatable elements is mounted for rotation with said output rotor and the other is mounted in a stationary position.

14. The apparatus that is defined in claim 8, wherein said control means includes a sequencer circuit for cycling said apparatus by sequentially activating said second clutch means, said brake means, and said reversible motor means, and a program circuit having a logic input and a logic output logically interconnecting said sequencer circuit, said sequencer circuit having first and second logically OR ed inputs connected respectively to said first switch means and said logic output of said program circuit for receiving signals therefrom for selectively triggering said sequencer circuit, a sync input connected to said second switch means providing synchronization to said sequencer circuit, a feedback logic output connected to said logic input of said program circuit to condition said program circuit in response to advancement of the film, analog drive outputs connected to said second clutch means and said brake means, and bipolar analog outputs connected to said reversible motor means for controlling operation of said output rotor for advancing the workpiece in increment.

15. The apparatus that is defined in claim 14, wherein said analog outputs connected to said clutch means and said brake means comprises each parallel connected first and second drive lines, said first drive line being driven by a relative low voltage drive source and said second drive line being initially pulsed by a relatively high voltage drive source so that said brake and said clutch can be rapidly energized by said pulsed high voltage source.

16. The apparatus that is defined in claim 14, wherein said sequencer circuit has a release input which when triggered allows said analog outputs to said brake means and said clutch means to be deenergized, thus allowing said output rotor to freely turn.

17. The apparatus that is defined in claim 14, wherein said sequencer circuit has a monostable multivibrator which, when triggered by said second switch means connected to said sync input, operates to drive one of said bipolar analog input and thus drive said reversible motor in its reverse direction for a predetermined time duration sufficient to return said metering arm to said stop means.

18. The apparatus that is defined in claim 14, wherein said program circuit has its logic input connected to said feedback output of said sequencer circuit, said logic input operates to count the number of cycles of said sequencer circuit initiated by said first switch means corresponding to a predetermined number of operations and then upon reaching a predetermined count said program circuit initiates via its logic output a preselected number of cycles of said sequencer circuit corresponding to a preselected number of skipped operations.

* * * * *